US009323659B2

(12) United States Patent
Shats et al.

(10) Patent No.: US 9,323,659 B2
(45) Date of Patent: Apr. 26, 2016

(54) CACHE MANAGEMENT INCLUDING SOLID STATE DEVICE VIRTUALIZATION

(75) Inventors: Serge Shats, Palo Alto, CA (US); Steven Ted Sanford, Mountain View, CA (US)

(73) Assignee: SANDISK ENTERPRISE IP LLC, Milpitas, CA (US)

( * ) Notice: Subject to any disclaimer, the term of this patent is extended or adjusted under 35 U.S.C. 154(b) by 99 days.

(21) Appl. No.: 13/572,486

(22) Filed: Aug. 10, 2012

(65) Prior Publication Data
US 2013/0042056 A1 Feb. 14, 2013

Related U.S. Application Data

(60) Provisional application No. 61/523,155, filed on Aug. 12, 2011.

(51) Int. Cl.
*G06F 12/02* (2006.01)
*G06F 12/08* (2006.01)

(52) U.S. Cl.
CPC ........ *G06F 12/0246* (2013.01); *G06F 12/0804* (2013.01); *G06F 12/0871* (2013.01); *G06F 2212/1016* (2013.01); *G06F 2212/1044* (2013.01); *G06F 2212/222* (2013.01);
(Continued)

(58) Field of Classification Search
CPC ............ G06F 12/0866; G06F 12/0804; G06F 12/0888; G06F 12/08; G06F 12/0842; G06F 12/0868; G06F 12/0875; G06F 12/0897
See application file for complete search history.

(56) References Cited

U.S. PATENT DOCUMENTS

| 5,809,527 | A | | 9/1998 | Cooper et al. |
| 5,832,515 | A | | 11/1998 | Ledain et al. |
| 5,963,983 | A | * | 10/1999 | Sakakura et al. ............. 711/202 |

(Continued)

FOREIGN PATENT DOCUMENTS

| EP | 1804169 A1 | 7/2007 |
| WO | WO 02/29575 A2 | 4/2002 |
| WO | WO 2008/042467 A1 | 4/2008 |

OTHER PUBLICATIONS

White Paper: The TRIM Command by Nathan Edwards Published by Maximum PC, Dec. 2009; pp. 1-3.*
(Continued)

*Primary Examiner* — Reginald Bragdon
*Assistant Examiner* — Paul Knight
(74) *Attorney, Agent, or Firm* — Morgan, Lewis & Bockius LLP

(57) ABSTRACT

A method of caching data is performed by a respective computer having one or more processors storing one or more storage management programs for execution by the one or more processors, non-volatile secondary storage and non-volatile cache memory. The method includes receiving from the non-volatile cache memory information identifying an amount of available storage in the non-volatile cache memory, and identifying a size of the management units in the non-volatile cache memory. The method further includes identifying write requests to write data to the non-volatile cache memory, sequentially writing to the non-volatile cache memory the write data for the identified write requests, to sequentially arranged locations in an address space of the non-volatile cache memory, and storing in memory metadata that maps the addresses or storage offsets of the write data to respective locations in the address space of the non-volatile cache memory.

17 Claims, 6 Drawing Sheets

(52) U.S. Cl.
CPC . *G06F2212/7201* (2013.01); *G06F 2212/7204* (2013.01); *G06F 2212/7207* (2013.01)

(56) References Cited

U.S. PATENT DOCUMENTS

| | | | |
|---|---|---|---|
| 6,014,724 A * | 1/2000 | Jenett | G06F 3/0607 711/103 |
| 6,209,058 B1 | 3/2001 | Shats et al. | |
| 6,490,651 B1 | 12/2002 | Shats et al. | |
| 6,535,949 B1 | 3/2003 | Parker | |
| 6,553,401 B1 | 4/2003 | Carter et al. | |
| 6,609,177 B1 | 8/2003 | Schlumberger et al. | |
| 6,865,650 B1 | 3/2005 | Morley et al. | |
| 7,577,783 B2 * | 8/2009 | Hsu | G11C 29/883 365/200 |
| 7,984,259 B1 | 7/2011 | English | |
| 8,621,145 B1 | 12/2013 | Kimmel et al. | |
| 2002/0091814 A1 | 7/2002 | Arendt et al. | |
| 2003/0217033 A1 | 11/2003 | Sandler et al. | |
| 2007/0033356 A1* | 2/2007 | Erlikhman | 711/162 |
| 2007/0198796 A1* | 8/2007 | Warren, Jr. | 711/165 |
| 2008/0147974 A1 | 6/2008 | Madison et al. | |
| 2008/0162795 A1* | 7/2008 | Hsieh | G06F 12/0866 711/103 |
| 2008/0189485 A1* | 8/2008 | Jung et al. | 711/115 |
| 2009/0031083 A1 | 1/2009 | Willis et al. | |
| 2009/0037646 A1* | 2/2009 | Molotchko et al. | 711/103 |
| 2009/0150599 A1 | 6/2009 | Bennett | |
| 2009/0210631 A1 | 8/2009 | Bosworth et al. | |
| 2010/0049718 A1 | 2/2010 | Aronovich et al. | |
| 2010/0070729 A1* | 3/2010 | Ng et al. | 711/166 |
| 2010/0077197 A1* | 3/2010 | Ergan et al. | 713/2 |
| 2010/0153617 A1 | 6/2010 | Miroshnichenko et al. | |
| 2010/0174846 A1 | 7/2010 | Paley et al. | |
| 2010/0174847 A1 | 7/2010 | Paley et al. | |
| 2010/0191897 A1* | 7/2010 | Zhang et al. | 711/103 |
| 2010/0199042 A1 | 8/2010 | Bates et al. | |
| 2010/0205367 A1* | 8/2010 | Ehrlich et al. | 711/113 |
| 2011/0022801 A1* | 1/2011 | Flynn | 711/120 |
| 2011/0047317 A1 | 2/2011 | Burkard et al. | |
| 2011/0066808 A1 | 3/2011 | Flynn et al. | |
| 2011/0153912 A1 | 6/2011 | Gorobets et al. | |
| 2011/0153913 A1 | 6/2011 | Huang et al. | |
| 2011/0191522 A1 | 8/2011 | Condict et al. | |
| 2012/0066760 A1 | 3/2012 | Anderson et al. | |
| 2012/0239869 A1 | 9/2012 | Chiueh et al. | |

OTHER PUBLICATIONS

Embedded Compact Flash by G. Koulouras, K. Kontakos, I. Stavrakas, J. Stonham, and C. Nomicos; Published by IEEE Aug. 2005; pp. 31-33.*

ONFI Standards and What They Mean to Designers by Michael Abraham; Micron Technologies; Aug. 2008 p. 7.*

NAND Flash Interface Specification by Dias and Ferreira; Informatics and Systems Engineering Dep. Informatics, University of Minho; Jul. 2007 p. 11.*

DFTL: A Flash Translation Layer Employing Demand-based Selective Caching of Page-level Address Mappings by Gupta, Kim and Urgaonakar; Computer Systems Laboratory Department of Computer Science and Engineering, The Pennsylvania State University; Aug. 2008; p. 10.*

NAND Flash-based Disk Cache Using SLC/MLC Combined Flash Memory by Hong and Shin; IEEE May 2010.*

HeteroDrive: Reshaping the Storage Access Pattern of OLTP Workload Using SSD by Kim, Jung, Kim, and Maeng; Proc. of IWSSPS 2009.*

Characterizing the Performance of Flash Memory Storage Devices and Its Impact on Algorithm Design; Ajwani, Malinger, Meyer, and Toledo; Springer 2008.*

FlashSoft Corporation, Invitation to Pay Additional Fees, PCT/US2012/026192, Jun. 26, 2012, 7 pgs.

FlashSoft Corporation, International Search Report/Written Opinion, PCT/US2011/039136, Feb. 9, 2012, 10 pgs.

FlashSoft Corporation, International Search Report/Written Opinion, PCT/US2012/026192, Aug. 22, 2012, 13 pgs.

Narayanan, Migrating Server Storage to SSDs: Analysis of Tradeoffs, EuroSys '09, Nuremberg, Germany, Apr. 1-3, 2009, 14 pgs.

Roberts, Integrating NAND Flash Devices Onto Servers, Communications of the ACM, V52, N4, Apr. 2009, 9 pgs.

Sandisk Enterprise IP LLC, Supplementary European Search Report and Written Opinion, EP 11790496.1, Nov. 25, 2013, 5 pgs.

Yang, Circular Balanced Erasing Algorithm for Flash Solid-State Disks, 9th Intl. Conference on Electronic Measurement & Instruments, Aug. 16-19, 2009, pp. 4-702 to 4-705.

Cooke, The Bip Buffer, www.codeproject.com/Articles/ 3479/The-Bip-Buffer-The-Circular-Buffer-with-a-Twist, May 9, 2003, 16 pgs.

Sandisk Enterprise IP LLC, ISR/WO, PCT/US2012/050424, Nov. 9, 2012, 12 pgs.

Smith, The Scientist and Engineer's Guide to Digital Signal Procetting, 1997-1998, Chapter 28, 32 pgs.

Definition of asynchronous, Free Online Dictionary of Computing, retrieved from http://foldoc.org/asynchronous, Oct. 25, 2013, 2 pages.

Huang et al., "Efficient Cache Design for Solid-State Drives," CF'10, Proceedings of the 7th ACM International Conference on Computing Frontiers, May 17-19, 2010, 10 pages.

Kim et al., "HeteroDrive: Reshaping the storage access pattern of OLTP workload using SSD," Proceedings of 4th International Workshop on Software Support for Portable Storage, Oct. 2009, 5 pages.

* cited by examiner

CACHE MANAGEMENT INCLUDING SOLID STATE DEVICE VIRTUALIZATION

RELATED APPLICATIONS

This application claims priority to U.S. provisional patent application No. 61/523,155, entitled "Cache Management Including Solid State Device Virtualization," filed Aug. 12, 2011, which is hereby incorporated by reference in its entirety.

TECHNICAL FIELD

The described embodiments relate generally to storage management, and software tools for solid state device address space virtualization.

BACKGROUND

Solid state storage devices (SSDs) have been growing in popularity. SSDs employ solid state memory to store data. The SSDs may be significantly faster than conventional hard disk drives. However, SSDs remain relatively expensive compared with disk drives. Moreover, SSDs have reliability challenges associated with repetitive erasing and writing of the solid state memory. For instance, to avoid premature failure of heavily used areas, wear-leveling may need to be used for SSDs to ensure data is not erased and written to one area significantly more frequently than other areas.

SUMMARY OF DISCLOSED EMBODIMENTS

In some implementations, a method of caching data is performed by a respective computer having one or more processors storing one or more storage management programs for execution by the one or more processors, non-volatile secondary storage and non-volatile cache memory. The method includes receiving from the non-volatile cache memory information identifying an amount of available storage in the non-volatile cache memory, and identifying a size of the management units in the non-volatile cache memory. The method further includes identifying write requests to write data to the non-volatile cache memory, sequentially writing to the non-volatile cache memory the write data for the identified write requests, to sequentially arranged locations in an address space of the non-volatile cache memory, and storing in memory metadata that maps the addresses or storage offsets of the write data to respective locations in the address space of the non-volatile cache memory.

In some embodiments, a computer system includes memory storing one or more programs, the one or more programs including one or more storage management programs, one or more processors for executing instructions in the one or more programs stored in memory, an interface to non-volatile secondary storage, and non-volatile cache memory. The non-volatile cache memory includes a controller responsive to commands sent by the one or more processors of the computer system. The one or more storage management programs include instructions that, when executed by the one or more processors, cause the computer system to perform any of the methods described herein.

In some embodiments, a non-volatile computer readable storage medium storing one or more storage management programs include instructions that, when executed by one or more processors of a computer system that includes the one or more processors, non-volatile secondary storage and non-volatile cache memory, the non-volatile cache memory including a controller responsive to commands sent by the one or more processors of the computer system, cause the computer system to perform any of the methods described herein.

DETAILED DESCRIPTION

Figure 1:
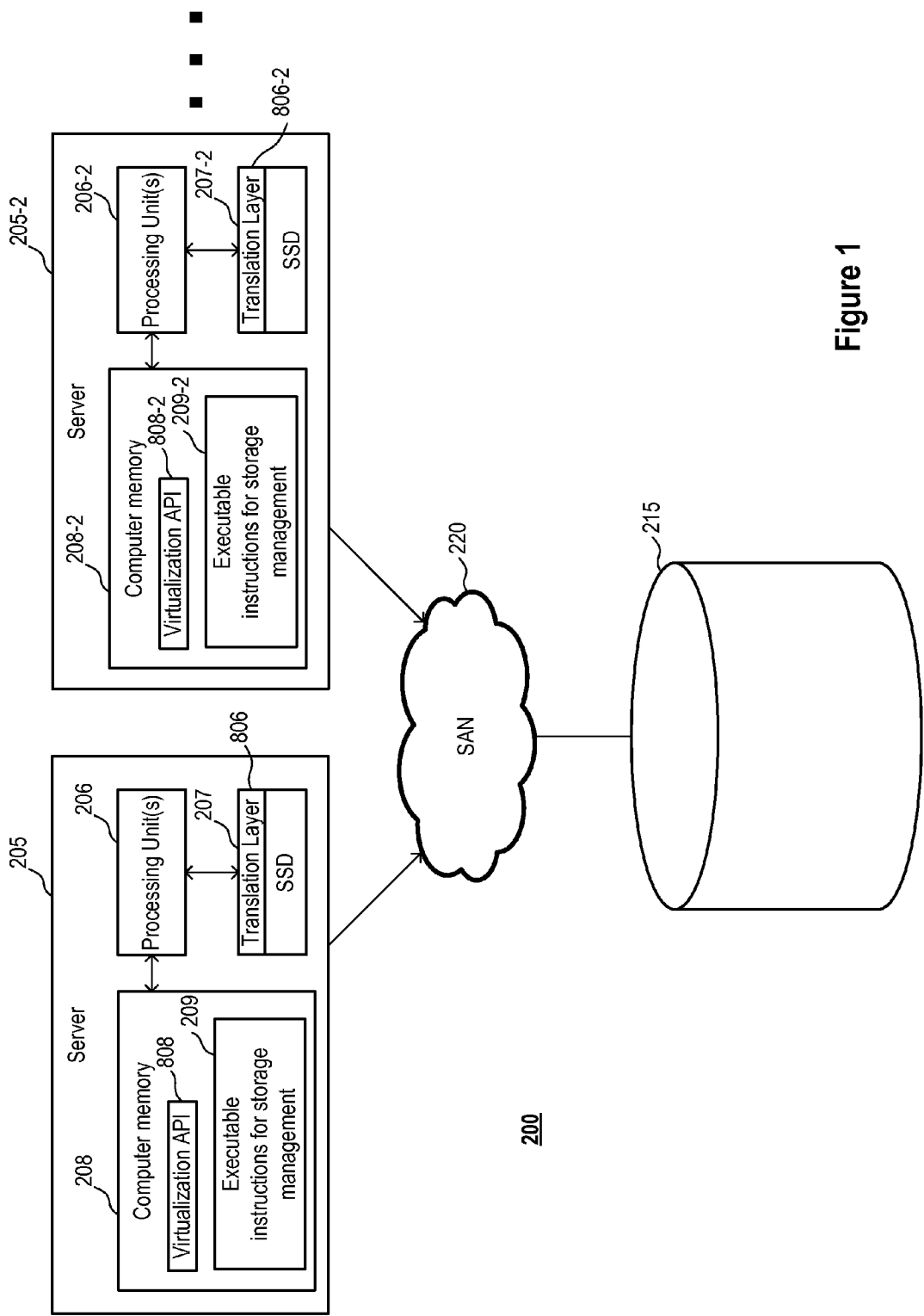
FIG. 1 is a schematic illustration of a computing system 200 arranged in accordance with some embodiments.

Certain details are set forth below to provide a sufficient understanding of embodiments of the invention. However, it will be clear to one skilled in the art that some embodiments may be practiced without various of the particular details. In some instances, well-known software operations, computing system components, circuits, control signals, and timing protocols have not been shown in detail in order to avoid unnecessarily obscuring the described embodiments of the invention.

As described herein, some SSDs include a controller with metadata management and address remapping. The metadata management functionality provided by an SSD is sometimes herein called a flash translation layer. In some implementations, the flash translation layer converts an original offset (sometimes called an address) in a received IO request into an SSD-internal offset, so as to access memory locations within the SSD corresponding to the address or original offset specified by the IO request. Multiple factors, such as wear leveling, contiguous write requirements, the time required to erase management units (units of storage in the SSD), and the need to avoid using damaged management units, impact on the mapping of addresses (or offsets) in received commands to internal locations or offsets in the SSD. Metadata management on an SSD introduces some overhead into the device access process, and typically requires periodic garbage collection and unallocated space reservation, also called space over-provisioning.

In some implementations, address remapping (external address to internal address mapping) provided by the SSD is used solely, or alternatively primarily, for wear-leveling control and to exclude damaged management units (MU) from use. The term Management Unit (also called Erasable Block or Erasable Unit) refers to a unit of storage in the SSD address space that can be erased atomically. In some implementations, address mapping by the SSD translation layer is used to keep the number of write operations to management unit substantially equal (e.g., within a factor of N, e.g., where N is typically a number between 2 and 8).

Moreover, remapping may also be required because flash-based SSDs do not allow the rewriting of a particular memory location without first erasing the memory location. Some SSDs may read a management unit that contains requested data into an internal buffer, update the data in the buffer, and write the update content from the buffer into an erased (e.g. clean) management unit. Other SSDs may avoid read-modify-write operations by instead writing random data sequentially and updating metadata accordingly. When data is being overwritten, the SSD typically writes the new data in a new location and invalidate the old copy, which is reflected in metadata of the SSD. As a result, data may be completely fragmented in the SSD, necessitating address translation to find the requested data. These remapping implementations may be time consuming and typically causes garbage collection.

SSDs typically over-provision management units for performance enhancement. For example, an SSD may maintain a large number of erased management units to ensure that a sufficient number of management units are immediately available for storing incoming write data. Accordingly, an SSD may have a larger amount of storage, e.g. flash memory, than it exposes to the operating system.

In some embodiments, an SSD is utilized as a cache memory for a computer system. Further, In some embodiments, executable instructions for storage management, executed by one or more processors of the computer system, are provided to manage data stored in the SSD, including metadata management and random to sequential write translation. In some implementations, the computer system includes an interface (sometimes herein called a virtualization API) to the translation layer of the SSD such that the translation layer of the SSD no longer performs address translation to convert writes to arbitrary memory locations into writes to sequential memory locations in the SSD. In some implementations, this reduces the SSD translation layer's complexity, reduces latency of the overall system, and eliminates or reduces the need for over-provisioning in the SSD.

There are many different types of SSDs, including flash-based SSDs. In various embodiments, SSDs are implemented as SATA or SAS devices. Flash memory usable in the embodiments of SSD described below optionally include flash memory in PCI-pluggable cards, Non-Volatile Memory express (NVMe) or in other forms compatible with an operating system.

Embodiments of systems using SSDs are described in co-pending application Ser. No. 13/153,117, entitled "Cache management and acceleration of storage media," filed Jun. 3, 2011; U.S. provisional application Ser. No. 61/351,740, entitled "Memory management and acceleration of storage media," filed Jun. 4, 2010; and U.S. provisional application 61/445,225 entitled "Storage management and acceleration of storage media including additional cluster implementations," filed Feb. 22, 2011, all of which are hereby incorporated by reference in their entireties.

The above-referenced applications describe examples of systems and methods for using an SSD as a local cache, including managing metadata and converting random to sequential memory requests.

FIG. 1 is a schematic illustration of a computing system 200 having a computing device, such as server system 205 (sometimes hereinafter called server 205) that includes storage, such as solid state drive (SSD) 207, that functions as a cache for storing data. In some embodiments, SSD 207 includes a translation layer 806. Translation layer 806 is optionally implemented in software, executed by processor in a controller within SSD 207. SSD 207 functions as a cache for storage media 215, which is coupled to server 205 over storage area network 220. Server 205 includes one or more processing units 206 and computer memory 208, which may be implemented as any type or number of computer readable media, storing a cache management driver 209 (also herein called executable instructions for storage management), a flash virtualization API 808, also herein called a virtualization API, as well as other programs or modules (e.g., an operating system and/or applications 305, FIG. 3, one or more standard drivers 310) and data (e.g., cache metadata 822, which optionally includes a cache map 824). The executable instructions for storage management 209, when executed by the one or more processing units 206, manage the execution of storage access requests and utilization of SSD 207 and storage media 215. For example, read and write requests are directed to storage media 215 or redirected to SSD 207, as appropriate. In some embodiments, the executable instructions for storage management 209 include instructions for translating write requests to the SSD 207 into sequential write requests, even when the offsets of addresses in the write requests are not sequential. In some implementations, virtualization API 808 operates in cooperation with translation layer 806 to relieve translation layer 806 from the responsibility of itself translating writes to arbitrarily distributed addresses into sequential writes to SSD 207.

In some implementations, one or more additional servers 205-$i$, such as server 205-2, are also coupled to the storage media 215 through storage area network 220. Each respective additional server 205-$i$ similarly includes an SSD 207-$i$, one or more processing units 206-$i$, and computer memory 208-$i$, including a cache management driver 209-$i$ (executable instructions for storage management). Various embodiments of system 200 include different numbers of such servers 205, which may be a server cluster, and some or all of the servers, which may be cluster nodes, may be provided with an SSD and software for storage management. In some implementations, the respective SSD 207-$i$ of a respective server 205-$i$ serves as a local cache for storage media 215. In some implementations, the respective SSD 207-$i$ includes a translation layer 808-$i$.

Substantially any type of SSD may be used to implement SSDs 207, including, but not limited to, any type of flash drive.

Although a particular server configuration is shown in FIG. 1, it is to be understood that other computer system configurations can be used to implement the data caching and cache management methods disclosed herein.

Moreover, although described above with reference to FIG. 1 as executable instructions 209 stored on a computer memory 208, the storage management functionalities described herein may in some embodiments be implemented in firmware, or combinations of software and firmware. Processing unit(s) 206 may be implemented as any type of single processor or arrangement of multiple processors.

Figure 2:
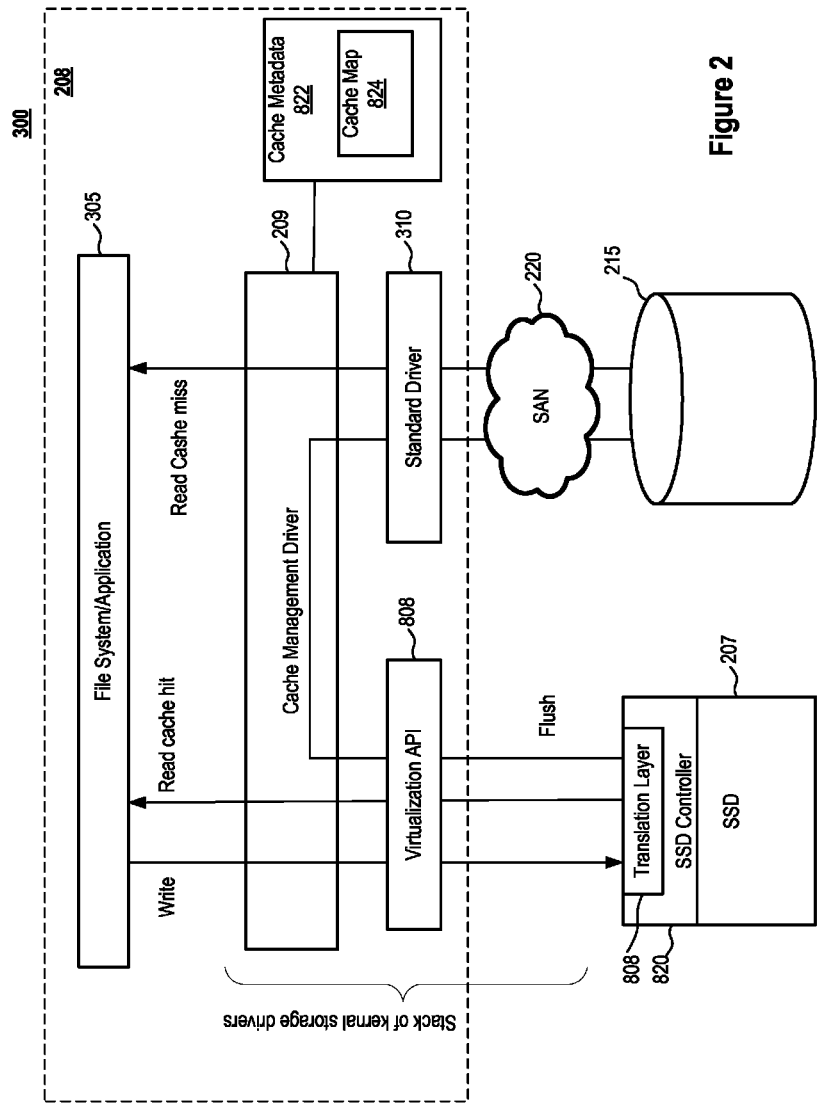
FIG. 2 is a schematic illustration of a block level filter driver 300 arranged in accordance with some embodiments.

In some implementations, the cache management driver 209 (executable instructions for storage management) is implemented as a block level filter driver. In other implementations, the cache management driver 209 is implemented as a file level filter driver, etc. An example of a block level filter driver 300 is shown in FIG. 2, where the executable instructions for storage management 209 are illustrated as a cache management driver. In some implementations, cache management driver 209 receives read and write commands from a file system or other application 305. The cache management driver 209 directs at least some write requests (e.g., write requests that satisfy predefined caching criteria) to SSD 207, and return read cache hits from SSD 207. Data associated with read cache misses are returned from storage device 215, via storage area network 220. In some implementations, cache management driver 209 also facilitates the flushing of data from SSD 207 onto storage media 215. In some implementations, cache management driver 209 interfaces with standard drivers 310 for communication with storage media 215 and optionally SSD 207. However, in some implementations cache management driver 209 interfaces with SSD by direct function calls that reduce SSD access latency. Placing cache management driver 209 between the file system or application 305 and above the standard drivers 310 may advantageously allow for manipulation of read and write commands at a block level but above the level of a volume manager used to accelerate storage media 215 with greater selectivity. That is, in some implementations, cache management driver 209 operates at a volume level, instead of a disk level.

In some embodiments, cache management driver 209 includes or interfaces with an independent module that implements a virtualization API 808 that provides an interface between the cache management driver 209 and a translation layer 808 of SSD 207. SSD 207 utilizes the translation layer 806 for wear-leveling control and address remapping. In some implementations, translation layer 806 is implemented as a software driver or firmware in a controller 820 of SSD 207. For example, SSD 207 may include one or more processors and include stored computer executable instructions that operate together to provide the described functionality of translation layer 806. However, in some embodiments, SSD 207 interfaces with the virtualization API 808 to replace some of the functions that otherwise would have been performed by translation layer 806 of SSD 207, which improves cache performance and space utilization. In particular, cache management driver 209 may be used to perform a substantial part of address remapping. This enhances cache performance and eliminates or reduces the need for over-provisioning in SSD 207, which improves SSD space utilization.

In some embodiments, SSD 207 is used as a circular buffer, which makes some functions of translation layer 806 redundant. For example, there is no need for resource-intensive procedures at SSD 207 to turn random writes into sequential writes because the cache management driver 209 already presents only sequential writes to SSD 207 for writing to the circular buffer. Replacing functions of the translation layer 806 through use of the virtualization API 808 to the cache management driver 209 is particularly advantageous for SSD devices having sophisticated software drivers for SSD management, such as PCIe or NVMe flash devices.

Accordingly, the virtualization API 808 provides an interface to the translation layer 806 and communicates with the translation layer 808 such that the translation layer 808 does not perform substantially any, and in most cases does not perform the most resource-intensive part of address remapping on requests received from or sent to the cache management driver 209 through the virtualization API 808.

In some embodiments, where the virtualization API 808 allows for the translation layer 806 to stop providing address translation functions for converting random write into sequential, the translation layer 806 may still retain wear-leveling and internal flash interleaving functionality. This may be advantageous also because the translation layer 806 may keep track of damaged management units that may be excluded from use. Tracking excluded management units of the SSD 207 may be complicated if the SSD is involved in an internal redundancy architecture, e.g. a RAID0 or RAID5 architecture. Accordingly, the SSD 207 through the translation layer 806 provides the virtualization API 808 with the location of useable space in the SSD 207, and cache management driver 209 is not required to account for damaged management units on SSD 207 or to compensate for the particular redundancy architecture provided in a system including SSD 207. In some implementations, cache management driver 209 uses TRIM commands to the SSD 207 to identify regions in virtual address space that require erasing.

Figure 3:
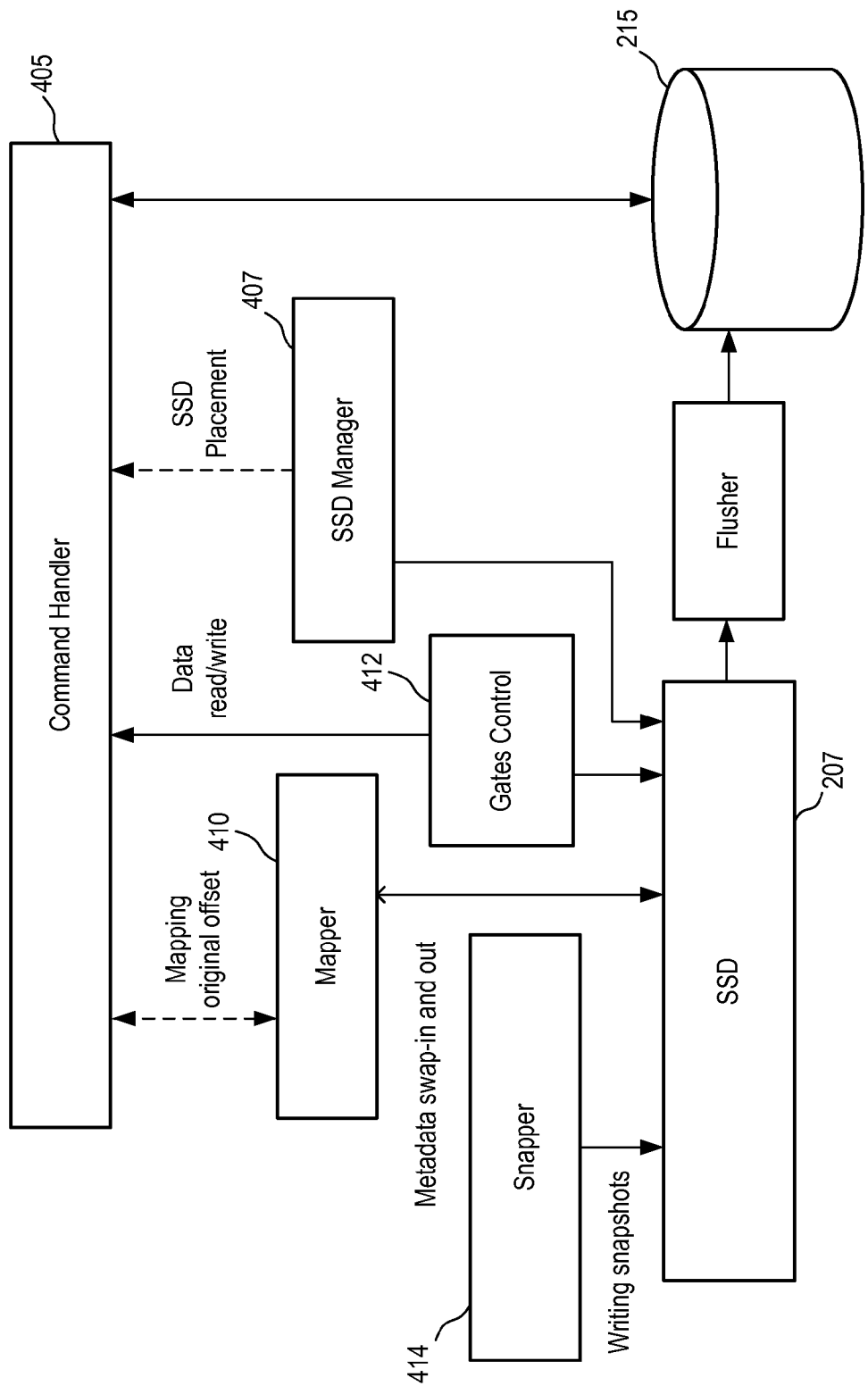
FIG. 3 is a schematic illustration of a cache management driver arranged in accordance with some embodiments.

The cache management driver 209 may be implemented using any number of functional blocks, as shown in FIG. 3. The cache management driver 209 may generally include a command handler 405 that may receive one or more commands from a file system or application and provides communication with the platform operating system. A SSD manager 407 may control data and metadata layout within the SSD 207. The data written to the SSD 207 may advantageously be stored and managed in a log structured cache format, as will be described further below. A mapper 410 may map original requested storage media 215 offsets into an offset for the SSD 207. A gates control block 412 may be provided in some examples to gate read and writes to the SSD 207, as will be described further below. The gates control block 412 may advantageously allow the cache management driver 209 to send a particular number of read or write commands during a given time frame that may allow increased performance of the SSD 207, as will be described further below. In some examples, the SSD 207 may be associated with an optimal number of read or write requests, and the gates control block 412 may allow the number of consecutive read or write requests to be specified, providing write coalescing upon writing in SSD. A snapper 414 may be provided to generate snapshots of metadata stored on the SSD 207 and write the snapshots to the SSD 207. The snapshots may be useful in crash recovery, as will be described further below. A flusher 418 may be provided to flush data from the SSD 207 onto other storage media 215, as will be described further below.

In some embodiments, data stored in local cache storage devices (e.g., SSD 207) is stored as a log structured cache. That is, the local cache storage devices function as a cache, while being structured as a log with data, and also metadata, written to the storage device in a sequential stream. In this manner, the local cache storage media (e.g., SSD 207) is used as a circular buffer. Furthermore, in some implementations, using SSD as a circular buffer allows a caching driver to use standard TRIM commands to instruct SSD to start erasing a specific portion of the SSD address space. In some implementations, these features of the disclosed embodiments allow SSD vendors to eliminate over-provisioning of SSD space and increase amount of active SSD space.

Figure 4:
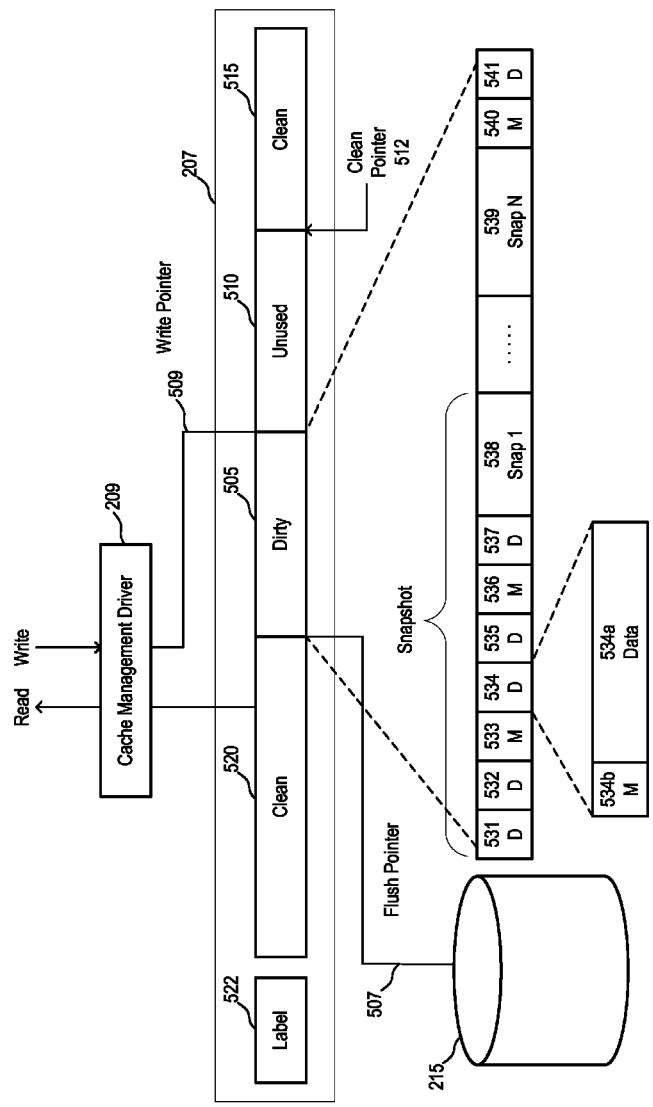
FIG. 4 is a schematic illustration of a log structured cache configuration in accordance with some embodiments.

FIG. 4 is a schematic illustration of a log structured cache configuration in accordance with some embodiments. The cache management driver 209 is illustrated which, as described above, may receive read and write requests from a file system or application. The SSD 207 stores data and attached metadata as a log structured cache, that includes a dirty region 505, an unused region 510, and clean regions 515 and 520. Because the SSD 207 may be used as a circular buffer, any region can be divided over the SSD 207 end boundary. In this example it is the clean regions 515 and 520 that may be considered contiguous regions that 'wrap around'. Data in the dirty region 505 corresponds to data stored on the SSD 207 but not flushed on the storage media 215 that the SSD 207 may be accelerating. That is, the data in the dirty region 505 has not yet been flushed to the storage media 215. The dirty data region 505 has a beginning designated by a flush pointer 507 and an end designated by a write pointer 509. The same region may also be used as a read cache. A caching driver may maintain a history of all read requests. It may then recognize and save more frequently read data in SSD. That is, once a history of read requests indicates a particular data region has been read a threshold number of times or more, or that the particular data region has been read with a particular frequency, the particular data region may be placed in SSD. The unused region 510 represents data that may be overwritten with new data. The beginning of the unused region 510 may be delineated by the write pointer 509. An end of the unused region 510 may be delineated by a clean pointer 512. The clean regions 515 and 520 contain valid data that has been flushed to the storage media 215. Clean data can be viewed as a read cache and can be used for read acceleration. That is, data in the clean regions 515 and 520 is stored both on the SSD 207 and the storage media 215. The beginning of the clean region is delineated by the clean pointer 512, and the end of the clean region is delineated by the flush pointer 507.

During operation, incoming write requests are written to a location of the SSD 207 indicated by the write pointer 509, and the write pointer is incremented to a next location. In this manner, writes to the SSD may be made consecutively as indicated by the write pointer. In this manner, contiguous writes may be maintained despite non-contiguous write requests being issued by a file system or other application.

Data from the SSD 207 is flushed to the storage media 215 from a location indicated by the flush pointer 507, and the flush pointer incremented. The data may be flushed in accordance with any of a variety of flush strategies. In some embodiments, data is flushed after reordering, coalescing and write cancellation. The data may be flushed in strict order of its location in accelerating storage media. Later and asynchronously from flushing, data is invalidated at a location indicated by the clean pointer 512, and the clean pointer incremented keeping unused region contiguous. In this manner, the regions shown in FIG. 4 may be continuously incrementing during system operation. A size of the dirty region 505 and unused region 510 may be specified as one or more system parameters such that a sufficient amount of unused space is supplied to satisfy incoming write requests, and the dirty region is sufficiently sized to reduce an amount of data that has not yet been flushed to the storage media 215.

Incoming read requests may be evaluated to identify whether the requested data resides in the SSD 207 at either a dirty region 505 or a clean region 515 and 520. The use of metadata may facilitate resolution of the read requests, as will be described further below. Read requests to locations in the clean regions 515, 520 or dirty region 505 cause data to be returned from those locations of the SSD, which is faster than returning the data from the storage media 215. In this manner, read requests may be accelerated by the use of cache management driver 209 and the SSD 207. Also in some embodiments, frequently used data may be retained in the SSD 207. That is, in some embodiments metadata associated with the data stored in the SSD 207 may indicate a frequency with which the data has been read. Frequently requested data may be retained in the SSD 207 even following invalidation. The frequently requested data may be invalidated and moved to a location indicated by the write pointer 509. In this manner, the frequently requested data is retained in the cache and may receive the benefit of improved read performance, but the contiguous write feature may be maintained.

As a result, writes to non-contiguous locations issued by a file system or application to the cache management driver 209 may be coalesced and converted into sequential writes to the SSD 207. The circular nature of the operation of the log structured cache described above may also advantageously provide wear leveling in the SSD.

Accordingly, embodiments of a log structured cache have been described above. By utilizing the log structured cache format, note that random writes are being converted by the cache management driver into sequential SSD requests, due to the circular nature of the cache. Examples of data structures stored in the log structured cache will now be described with further reference to FIG. 4. The log structured cache may take up all or any portion of the SSD 207. The SSD may also store a label 522 for the log structured cache. The label 522 may include administrative data including, but not limited to, a signature, a machine ID, and a version. The label 522 may also include a configuration record identifying a location of a last valid data snapshot. Snapshots may be used in crash recovery, and will be described further below. The label 522 may further include a volume table having information about data volumes accelerated by the cache management driver 209, such as the storage media 215. It may also include pointers and least recent snapshots.

Data records stored in the dirty region 505 are illustrated in greater detail in FIG. 4. In particular, data records 531-541 are shown. Data records associated with data are indicated with a "D" label in FIG. 4. Records associated with metadata map pages, which will be described further below, are indicated with an "M" label in FIG. 4. Records associated with snapshots are indicated with a "Snap" label in FIG. 4. Each record has associated metadata stored along with the record, typically at the beginning of the record. For example, an expanded view of data record 534 is shown a data portion 534*a* and a metadata portion 534*b*. The metadata portion 534*b* includes information which may identify the data and may be used, for example, for recovery following a system crash. The metadata portion 534*b* may include, but is not limited to, any or all of a volume offset, length of the corresponding data, and a volume unique ID of the corresponding data. The data and associated metadata may be written to the SSD as a single transaction.

Snapshots, such as the snapshots 538 and 539 shown in FIG. 4, may include metadata from each data record written since the previous snapshot. Snapshots may be written with any of a variety of frequencies. In some examples, a snapshot may be written following a particular number of data writes. In some examples, a snapshot may be written following an amount of elapsed time. Other frequencies may also be used (for example, writing snapshot upon system graceful shutdown). By storing snapshots, recovery time after crash may advantageously be shortened in some embodiments. That is, a snapshot may contain metadata associated with multiple data records. In some examples, each snapshot may contain a map tree to facilitate the mapping of logical offsets to volume offsets, described further below, and any dirty map pages corresponding to pages that have been modified since the last snapshot. Reading the snapshot following a crash recovery may eliminate or reduce a need to read many data records at many locations on the SSD 207. Instead, many data records may be recovered on the basis of reading a snapshot, and fewer individual data records (e.g. those written following the creation of the snapshot) may need to be read. During operation, a last valid snapshot may be read to recover the map-tree at the time of the last snapshot. Then, data records written after the snapshot may be individually read, and the map tree modified in accordance with the data records to result in an accurate map tree following recovery. In addition to fast recovery, snapshots may play a role in metadata sharing in cluster environments that will be discussed further below.

Note, in FIG. 4, that metadata and snapshots may also be written in a continuous manner along with data records to the SSD 207. This may allow for improved write performance by decreasing a number of writes and level of fragmentation and reduce the concern of wear leveling in some embodiments.

A log structured cache may allow the use of a TRIM command very efficiently. A caching driver may send TRIM commands to the SSD when an appropriate amount of clean data is turned into unused (invalid) data. This may advantageously simplify SSD internal metadata management and improve wear leveling in some embodiments.

Accordingly, embodiments of log structured caches have been described above that may advantageously be used in SSDs serving as local caches. The log structure cache may advantageously provide for continuous write operations and may reduce incidents of wear leveling. When data is requested by the file system or other application using a logical address, it may be located in the SSD 207 or storage media 215. The actual data location is identified with reference to the metadata. Embodiments of metadata management will now be described in greater detail.

Embodiments of mapping described herein generally provide offset translation between original storage media offsets (which may be used by a file system or other application) and actual offsets in a local cache or storage media. As generally described above, when an SSD is utilized as a local cache the cache size may be quite large (hundreds of GBs or more in some examples). The size may be larger than traditional (typically in-memory) cache sizes. Accordingly, it may not be feasible or desirable to maintain all mapping information in system memory, such as on the computer accessible media 208 of FIG. 1. Accordingly, some embodiments provide multi-level mapping management in which some of the mapping information is stored in the system memory, but some of the mapping information is itself cached.

Figure 5:
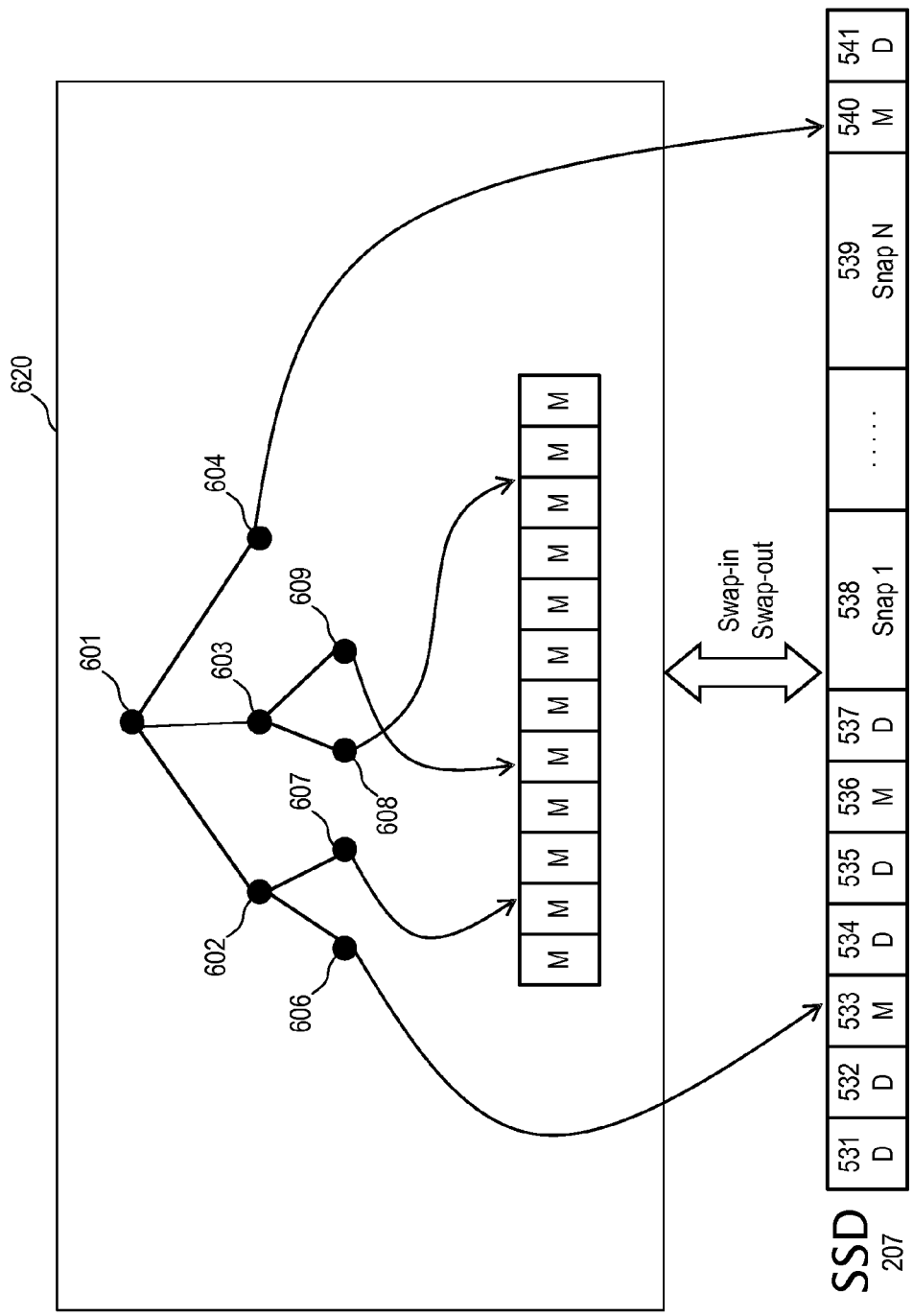
FIG. 5 is a schematic illustration of stored mapping information in accordance with some embodiments.

FIG. 5 is a schematic illustration of stored mapping information in accordance with some embodiments. The mapping may describe how to convert a received storage media offset from a file system or other application into an offset for a local cache, such as the SSD 207 of FIG. 1. An upper level of the mapping information may be implemented as some form of a balanced tree (an RB-tree, for example), as is generally known in the art, where the length of all branches is relatively equal to maintain predictable access time. As shown in FIG. 5, the mapping tree may include a first node 601 which may be used as a root for searching. Each node of the tree may point to a metadata page (called map pages) located in the memory or in SSD. The next nodes 602, 603, 604 may specify portions of storage media address space next to the root specified by the first node 601. In the example of FIG. 5, the node 604 is a final 'leaf' node containing a pointer to one or more corresponding map pages. Map pages provide a final mapping between specific storage media offsets and SSD offsets. The final nodes 605, 606, 607, and 608 also contain pointers to map pages. The mapping tree is generally stored on a system memory 620, such as the computer accessible media 208 of FIG. 1. Any node may point to map pages that are themselves stored in the system memory or may contain a pointer to a map page stored elsewhere (in the case, for example, of swapped-out pages), such as in the SSD 207 of FIG. 1. In this manner, not all map pages are stored in the system memory 620. As shown in FIG. 5 the node 606 contains a pointer to the record 533 in the SSD 207. The node 604 contains a pointer to the record 540 in the SSD 207. However, the nodes 607, 608, and 609 contain pointers to mapping information in the system memory 620 itself. In some examples, the map pages stored in the system memory 620 itself may also be stored in the SSD 207. Such map pages are called 'clean' in contrast to 'dirty' map pages that do not have a persistent copy in the SSD 207.

During operation, a software process, such as the mapper 410 of FIG. 3 may receive a storage media offset associated with an original command from a file system or other application. The mapper 410 may consult a mapping tree in the system memory 620 to determine an SSD offset for the memory command. The tree may either point to the requested mapping information stored (swapped out) in the system memory itself, or to a map page record stored in the SSD 207. The map page may not be present in metadata cache, and may be loaded first. Reading the map page into the metadata cache may take longer, accordingly frequently used map pages may advantageously be stored in the system memory 620. In some embodiments, the mapper 410 may track which map pages are most frequently used, and may prevent the most or more frequently used map pages from being swapped out. In accordance with the log structured cache configuration described above, map pages written to the SSD 207 may be written to a continuous location specified by the write pointer 509 of FIG. 4.

Accordingly, embodiments of multilevel mapping have been described above. By maintaining some metadata map pages in system memory, access time for referencing those cached map pages may advantageously be reduced. By storing other of the metadata map pages in the SSD 207 or other local cache device, the amount of system memory storing metadata may advantageously be reduced. In this manner, metadata associated with a large amount of data (hundreds of gigabytes of data in some examples) stored in the SSD 207 may be efficiently managed.

Figure 6:
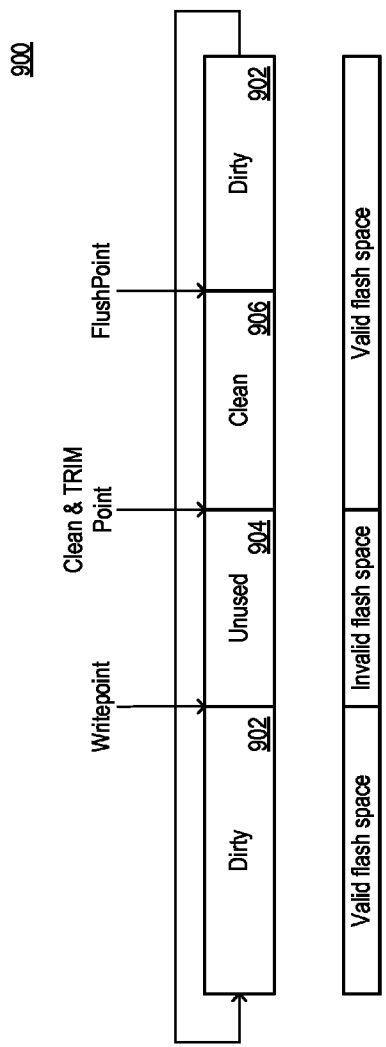
FIG. 6 is a schematic illustration of an arrangement of SSD drive storage in accordance with some embodiments.

FIG. 6 is a schematic illustration of storage locations in an SSD 900 in accordance with some embodiments. As has been described above, some embodiments organize storage space on an SSD as a circular buffer. In FIG. 6 an SSD 900 may include a dirty region 902, an unused region 904, and a clean region 906. The dirty region 902 is shown in two locations to illustrate the circular nature of the buffer. A write pointer delineates the location between the dirty region 902 and unused region 904, a clean (TRIM) pointer delineates the location between the unused and clean regions, and a flush pointer delineates the location between the clean and dirty regions. These pointers are moved during operation of the SSD to track the moving regions. The dirty, unused, and clean regions have been described above, but an overview is provided again here. Recall the dirty region 902 may be shared by read and write cache data. The write cache data in the dirty region 902 has not been flushed to other storage media yet and is on the SSD 900 only. The unused region 904 is reserved for new data, and the clean region 906 contains valid data that has already been flushed to other storage media.

When the unused region 904 shrinks in size (e.g. due to new writes), the cache management driver may begin invalidating data from the clean region 906, which may include sending TRIM commands to the SSD 900 from the cache management driver via a virtualization API. The dirty region 902 and clean region 906 represent valid flash space that may be validly read from, while the unused region 904 represents invalid flash space which may not be read by the caching software.

A translation layer of the SSD 900 may be used to manage which management units are used to form the regions shown. For example, as has been described above, new data may be written by a cache management driver sequentially in the unused region 904 by writing to a location indicated by the clean pointer and incrementing the clean pointer. When the cache management driver provides a command to write new data, the translation layer 806 may allocate a newly erased management unit or else the request may continue writing in a currently-assigned management unit that still has available space. The translation layer 806 may therefore control new management unit allocation. In this manner, the cache management driver 209 may not need to determine which management units of the SSD 207 of FIG. 1 are valid and available for use in the unused region.

If a management unit becomes bad (e.g. fails), the translation layer 806 may notify the cache management driver 209 through the virtualization API 808 that there has been a change to the available SSD space. In response to an indication of a failed management unit, or a predetermined number of failed management units, the cache management driver 209 may increase the size of the unused region 904. This may allow an amount of useable space in the unused region 904 to remain stable even as management units fail, for example.

Figure 7:
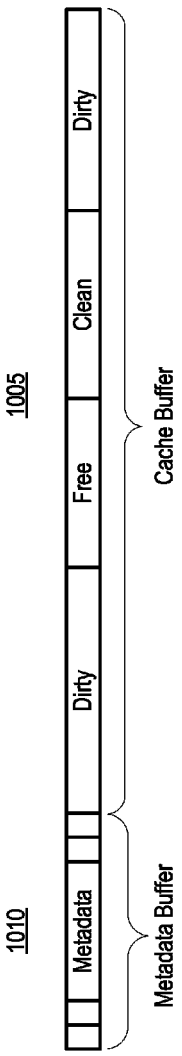
FIG. 7 is a schematic illustration of circular buffers in accordance with some embodiments.

FIG. 7 is a schematic illustration of circular buffers in accordance with some embodiments. The cache buffer 1005 may be arranged in dirty, unused, and clean regions, as has been described above. In some implementations, SSDs include another circular buffer for metadata, the metadata buffer 1010 shown in FIG. 7. The metadata buffer 1010 may store metadata of the cache management driver 209 itself, which is different than the metadata described above with reference to FIGS. 4 and 5. For example, the cache management driver 209 may update information about accelerated volumes and may update a root metadata pointer which may be required at boot time. This type of information may be stored in the metadata buffer 1010 which may also be a circular buffer.

Generally, the metadata buffer 1010 may be small in size (e.g. 1-2 MB, which may be a few management units worth of storage space in some examples). The metadata buffer 1010 may also be of a fixed size, in contrast with the cache buffer 1005 which, as described above, may be a variable size as a size of the unused region may grow if management units become unusable. Because the metadata buffer 1010 has a fixed size, if a management unit that belongs to the metadata buffer 1010 becomes unusable, it may be substituted by another valid management unit which must be taken from the pool of clean and not assigned management units. Accordingly, this would remove a management unit from use in the clean region, and result in an increase in the size of the clean region of the cache buffer 1005.

In some embodiments, cache management driver 209 sends metadata to the SSD for storage in metadata buffer 1010, send commands to the SSD for using metadata buffer 1010 as a circular buffer, including commands to erase specified management units in metadata buffer 1010. In some implementations, once erased, management units previously used in metadata buffer 1010 are inserted into a common list of available management units maintained by translation layer 806. In this manner, all management units may be involved in wear-leveling maintained by translation layer 806, including the management units used in metadata buffer 1010.

Referring again to FIGS. 1 and 2, some additional details of the virtualization API 808 will now be described. In some implementations, communication between the cache management driver and the translation layer 806, facilitated by virtualization API 808, is based on a direct function call interface. In this manner, virtualization API 808 helps to avoid overhead associated with a standard IO stack. In some implementations, virtualization API 808 includes some or all of the following functions and callbacks. The use of particular call names is by way of example only and is not intended to be limiting.

FioQueryFlashInfo( ). This function returns a total available size of the SSD storage, the size of management units on the SSD, and an initial number of unavailable management units. Using this information, cache management driver 209 sets an initial size of the cache buffer 1005 (FIG. 7), and sets sizes for the dirty, unused, and clean regions of cache buffer 1005. The unused region 510 (FIG. 4) or 904 (FIG. 6) is sometimes called the free region.

FioRegisterCallbacks( ). This function may define a vector of pointers at callback functions that can be called from the translation layer of the SSD.

FioSetMetadataBufferSize( ). This function may set a size of a metadata buffer in terms of a number of management units.

FioWrite( ). This function may start write 10 and may contain a buffer ID, e.g. metadata or cache buffer, offset in the buffer to place the write, length of data to be written, scatter-gather list of user buffer in the memory, and a cookie.

FioRead( ). This function may start read 10 and may contain a buffer ID, e.g. metadata or cache buffer, offset in the buffer for the read location, length of data to be read, scatter-gather list of user buffer in the memory, and a cookie.

FioTrim( ). This function forces the translation layer of the SSD to erase specified management units (e.g., management units in clear region 906, starting at the current location of the clean pointer), for example to generate space in unused region 904. In some implementations, the function includes a buffer ID, e.g., metadata or cache buffer ID, offset in the buffer to the location to be erased, length to erase; the offset and length parameters are typically aligned with management units boundaries. In some implementations, the cache management driver utilizes information returned from the FioQueryFlashInfo( ) function to obtain the management unit size and to determine the offset and length parameters to be used in commands sent via this API function.

FioQueryAvailableSpace( ). In some implementations, this function returns the size of available space in the SSD after removing bad management units.

FioIoCompletionCallback( ). In some implementations, this function is called by the translation layer (in the SSD) when a read, write or erase operation is completed. In some implementations, the translation layer receives, responsive to this call, a status and cookie. In some implementations, this function may be called in arbitrary, interrupted context.

FioIncreaseFreeSizeCallback( ). In some implementations, this function is called by the translation layer (in the SSD) when bad management units are discovered. In some implementations, this function provides to the cache management driver a total size of the unavailable management units. This function may be called in arbitrary context. In some implementations, responsive to this call, the cache management driver expands a size of the unused region 904 of a cache buffer.

In some implementations, a method of caching data is performed by a respective computer system (e.g., server 205 of the system 200 shown in FIG. 1) having one or more processors 206 (FIG. 1), memory 208 (FIG. 1) storing one or more storage management programs (e.g., cache management driver 209) for execution by the one or more processors 206, non-volatile secondary storage 215 and non-volatile cache memory (e.g., SSD 207), the non-volatile cache memory including a controller 820 (FIG. 2) responsive to commands sent by the one or more processors of the computer system. In some embodiments, the method includes receiving from the non-volatile cache memory information identifying an amount of available storage in the non-volatile cache memory, and identifying a size of the management units in the non-volatile cache memory. In the example provided above, such information is obtained using the FioQueryFlashInfo( ) function.

The method further includes identifying write requests to write data to the non-volatile cache memory, each identified write request including an address or storage offset and write data. For example, in some implementations, identifying the write requests to write data to the non-volatile cache memory includes receiving write requests to write data to non-volatile storage, each write request including an address or storage offset and write data, and identifying a subset of the received write requests in accordance with caching criteria.

The method further includes sequentially writing to the non-volatile cache memory the write data for the identified write requests. Sequentially writing the write data to the non-volatile cache memory includes writing to sequentially arranged locations in an address space of the non-volatile cache memory, without regard to how randomly distributed the write data may be in terms of the addresses or offsets of the write data. For example, in some implementations the addresses or offsets of the write data are addresses or offsets in an address space of secondary storage 215 used by the computer system.

The method further includes storing in the computer system metadata that maps the addresses or storage offsets of the write data to respective locations in the address space of the non-volatile cache memory.

In some implementations, the method includes maintaining, at the computer system, a write pointer, a clean pointer and a flush pointer (e.g., see FIGS. 4 and 5), said pointers corresponding to boundaries of unused, clean and dirty regions of the non-volatile cache memory. The pointers identify distinct locations in the predefined sequence of available management units in the non-volatile cache memory. Maintaining the pointers includes advancing the write pointer as write data is sequentially written to the non-volatile cache memory.

In some implementations, the received information identifying an amount of available storage in the non-volatile cache memory includes information identifying a size of the address space of the non-volatile cache memory and information identifying an amount of the address space corresponding to unavailable (e.g., defective) management units in the non-volatile cache memory. In some implementations, the size of said address space of the non-volatile cache memory remains fixed throughout performance of the method. Further, in some implementations, maintaining the write, clean and flush pointers includes maintaining these pointers so as to maintain the unused region at a size that is greater than the amount of the address space corresponding to unavailable management units in the non-volatile cache memory.

In some implementations, maintaining the write, clean and flush pointers includes sending commands to the non-volatile cache memory to flush data in the dirty region of the non-volatile cache memory to said non-volatile secondary storage, and to advance the flush pointer, thereby moving a shared boundary of the clean and dirty regions.

In some implementations, maintaining the write, clean and flush pointers includes sending commands to the non-volatile cache memory to invalidate data in the clean region of the non-volatile cache memory, and to advance the clean pointer, thereby moving a shared boundary of the clean and unused regions. In some implementations, the commands to invalidate data in the clean region are commands to erase corresponding management units in the non-volatile cache memory.

In some implementations, the aforementioned received information identifying an amount of available storage in the non-volatile cache memory includes information identifying a size of the address space of the non-volatile cache memory.

In some implementations, the address space of the non-volatile cache memory is a contiguous virtual address space that is mapped by the non-volatile cache memory to physical memory in the non-volatile cache memory. In some implementations, the address space of the non-volatile cache memory is a virtual address space, and the addresses or storage offsets in the identified write requests are addresses or offsets in an address space of the non-volatile secondary storage.

In some implementations, the non-volatile cache memory is solid state storage (e.g., implemented using one or more solid state storage devices). In some implementations, the non-volatile cache memory is flash memory. In some implementations, the non-volatile secondary storage is implemented using one or more hard disk storage devices.

In some embodiments, a computer system includes memory storing one or more programs, the one or more programs including one or more storage management programs, one or more processors for executing instructions in the one or more programs stored in memory, an interface to non-volatile secondary storage, and non-volatile cache memory. The non-volatile cache memory includes a controller responsive to commands sent by the one or more processors of the computer system. The one or more storage management programs include instructions that, when executed by the one or more processors, cause the computer system to perform any of the methods described above.

In some embodiments, a non-volatile computer readable storage medium storing one or more storage management programs include instructions that, when executed by one or more processors of a computer system that includes the one or more processors, non-volatile secondary storage and non-volatile cache memory, the non-volatile cache memory including a controller responsive to commands sent by the one or more processors of the computer system, cause the computer system to perform any of the methods described above.

Accordingly, some embodiments described above allow for a simplified or reduced-functionality translation layer of an SSD, such as a flash device. In particular, with respect to address translation, the translation layer of the SSD needs only to map the virtual addresses or offsets received in commands from the SSD to management units in the SSD, and need not handle translation from storage system addresses or offsets to internal addresses or offsets, except for wear-leveling and to avoid using defective management units.

From the foregoing it will be appreciated that, although specific embodiments of the invention have been described herein for purposes of illustration, various modifications may be made without deviating from the spirit and scope of the present invention.

What is claimed is:

1. A method of caching data in a computer system having one or more processors, memory storing one or more storage management programs for execution by the one or more processors, non-volatile cache memory, and an interface to a non-volatile secondary storage, the method comprising:
    identifying two or more write requests to write data, wherein each write request of the two or more identified write requests includes an address or storage offset in the non-volatile secondary storage and write data;
    sequentially writing the write data for the two or more identified write requests to sequential locations in the non-volatile cache memory; and
    storing metadata, in the memory of the computer system, that maps the addresses or storage offsets in the non-volatile secondary storage for the write data corresponding to the two or more identified write requests to the sequential locations in the non-volatile cache memory;

wherein the memory of the computer system is distinct from the non-volatile secondary storage and distinct from the non-volatile cache memory, and the non-volatile secondary storage is distinct from the non-volatile cache memory, the method further comprising:

maintaining, at the computer system, a write pointer corresponding to a boundary of an unused region of the non-volatile cache memory, a clean pointer corresponding to a boundary of a clean region of the non-volatile cache memory, the clean region storing data that has been flushed to the non-volatile secondary storage and that can be read from the non-volatile cache memory by the computer system, and a flush pointer corresponding to a boundary between the clean region and a dirty region of the non-volatile cache memory, the dirty region storing data that has not been flushed to the non-volatile secondary storage and that can be read from the non-volatile cache memory by the computer system, wherein the, write, clean, and flush pointers identify distinct locations in the non-volatile cache memory; and wherein maintaining the write pointer includes advancing the write pointer as write data is sequentially written to the non-volatile cache memory, the method further including:

receiving information identifying an amount of available storage in the non-volatile cache memory and information identifying a size of the address space of the non-volatile cache memory and an amount of said address space corresponding to unavailable management units in the non-volatile cache memory;

wherein the size of said address space of the non-volatile cache memory remains fixed throughout performance of the method; and said maintaining further comprises maintaining said pointers so as to maintain said unused region at a size that is greater than an amount of said address space corresponding to unavailable management units in the non-volatile cache memory.

2. The method of claim 1, wherein identifying write requests to write data to the non-volatile cache memory comprises:

receiving write requests to write data to non-volatile storage, each write request including an address or storage offset and write data; and identifying a subset of the received write requests in accordance with caching criteria.

3. The method of claim 1, wherein sequentially writing comprises sending write commands to a controller of the non-volatile cache memory identifying the sequential locations within the non-volatile cache memory, without regard to the addresses or storage offsets in the non-volatile secondary storage that are associated with the write data.

4. The method of claim 1, wherein said maintaining includes sending commands to the non-volatile cache memory to flush data in the dirty region of the non-volatile cache memory to said non-volatile secondary storage, and to advance the flush pointer, thereby moving a shared boundary of the clean and dirty regions.

5. The method of claim 1, wherein said maintaining includes sending commands to the non-volatile cache memory to invalidate data in the clean region of the non-volatile cache memory, and to advance the clean pointer, thereby moving a shared boundary of the clean and unused regions.

6. The method of claim 5, wherein the commands to invalidate data in the clean region comprise commands to erase corresponding management units in the non-volatile cache memory.

7. The method of claim 1, wherein the address space of the non-volatile cache memory comprises a contiguous virtual address space that is mapped by the non-volatile cache memory to physical memory in the non-volatile cache memory.

8. The method of claim 1, wherein the address space of the non-volatile cache memory comprises a virtual address space, and the address or storage offset in said identified write requests comprises addresses or offsets in an address space of the non-volatile secondary storage.

9. The method of claim 1, wherein the non-volatile cache memory comprises solid state storage.

10. The method of claim 1, wherein the non-volatile cache memory comprises flash memory.

11. The method of claim 1, wherein the non-volatile secondary storage comprises one or more hard disk storage devices.

12. A computer system, comprising:

memory storing one or more programs, the one or more programs including one or more storage management programs;

one or more processors for executing instructions in the one or more programs stored in memory;

an interface to non-volatile secondary storage; and non-volatile cache memory, the non-volatile cache memory including a controller responsive to commands sent by the one or more processors of the computer system;

the one or more storage management programs comprising instructions that, when executed by the one or more processors, cause the computer system to:

identify two or more write requests to write data, wherein each write request of the two or more identified write requests includes an address or storage offset in the non-volatile secondary storage and write data;

sequentially write the write data for the two or more identified write requests to sequential locations in the non-volatile cache memory; and store metadata, in the memory of the computer system, that maps the addresses or storage offsets in the non-volatile secondary storage for the write data corresponding to the two or more identified write requests to the sequential locations in the non-volatile cache memory;

wherein the memory of the computer system is distinct from the non-volatile secondary storage and distinct from the non-volatile cache memory, and the non-volatile secondary storage is distinct from the non-volatile cache memory, the one or more storage management programs further comprising instructions that, when executed by the one or more processors, cause the computer system to:

maintain, at the computer system, a write pointer corresponding to a boundary of an unused region of the non-volatile cache memory, a clean pointer corresponding to a boundary of a clean region of the non-volatile cache memory, the clean region storing data that has been flushed to the non-volatile secondary storage and that can be read from the non-volatile cache memory by the computer system, and a flush pointer corresponding to a boundary between the clean region and a dirty region of the non-volatile cache memory, the dirty region storing data that has not been flushed to the non-volatile secondary storage and that can be read from the non-volatile cache memory by the computer system, wherein the, write, clean, and flush pointers identify distinct locations in the non-volatile cache memory; and wherein maintaining the write pointer includes advancing the write pointer as write data is sequentially written to the non-volatile cache memory, the one or more storage management programs further including instructions that, when executed by the one or more processors, cause the computer system to receive information identifying an amount of available storage in the non-volatile cache memory and information identifying a size of the address space of the non-volatile cache memory and an amount of said address space corresponding to unavailable management units in the non-volatile cache memory;

wherein the size of said address space of the non-volatile cache memory remains fixed; and said maintaining further comprises maintaining said pointers so as to maintain said unused region at a size that is greater than an amount of said address space corresponding to unavailable management units in the non-volatile cache memory.

13. The computer system of claim 12, wherein identifying write requests to write data to the non-volatile cache memory comprises:

receiving write requests to write data to non-volatile storage, each write request including an address or storage offset and write data; and identifying a subset of the received write requests in accordance with caching criteria.

14. The computer system of claim 12, wherein sequentially writing comprises sending write commands to the controller of the non-volatile cache memory identifying the sequential locations within the non-volatile cache memory, without regard to the addresses or storage offsets in the non-volatile secondary storage that are associated with the write data.

15. A non-volatile computer readable storage medium storing one or more storage management programs comprising instructions that, when executed by one or more processors of a computer system that includes the one or more processors, non-volatile secondary storage and non-volatile cache memory, the non-volatile cache memory including a controller responsive to commands sent by the one or more processors of the computer system, cause the computer system to:

identify two or more write requests to write data, wherein each write request of the two or more identified write requests includes an address or storage offset in the non-volatile secondary storage and write data;

sequentially write the write data for the two or more identified write requests to sequential locations in the non-volatile cache memory; and store metadata, in the memory of the computer system, that maps the addresses or storage offsets in the non-volatile secondary storage for the write data corresponding to the two or more identified write requests to the sequential locations in the non-volatile cache memory;

wherein the memory of the computer system is distinct from the non-volatile secondary storage and distinct from the non-volatile cache memory, and the non-volatile secondary storage is distinct from the non-volatile cache memory, the one or more storage management programs further comprising instructions that, when executed by the one or more processors, cause the computer system to:

maintain, at the computer system, a write pointer corresponding to a boundary of an unused region of the non-volatile cache memory, a clean pointer corresponding to a boundary of a clean region of the non-volatile cache memory, the clean region storing data that has been flushed to the non-volatile secondary storage and that can be read from the non-volatile cache memory by the computer system, and a flush pointer corresponding to a boundary between the clean region and a dirty region of the non-volatile cache memory, the dirty region storing data that has not been flushed to the non-volatile secondary storage and that can be read from the non-volatile cache memory by the computer system, wherein the, write, clean, and flush pointers identify distinct locations in the non-volatile cache memory; and wherein maintaining the write pointer includes advancing the write pointer as write data is sequentially written to the non-volatile cache memory, the one or more storage management programs further including instructions that, when executed by the one or more processors, cause the computer system to receive information identifying an amount of available storage in the non-volatile cache memory and information identifying a size of the address space of the non-volatile cache memory and an amount of said address space corresponding to unavailable management units in the non-volatile cache memory;

wherein the size of said address space of the non-volatile cache memory remains fixed; and said maintaining further comprises maintaining said pointers so as to maintain said unused region at a size that is greater than an amount of said address space corresponding to unavailable management units in the non-volatile cache memory.

16. The non-volatile computer readable storage medium of claim 15, wherein identifying write requests to write data to the non-volatile cache memory comprises:

receiving write requests to write data to non-volatile storage, each write request including an address or storage offset and write data; and identifying a subset of the received write requests in accordance with caching criteria.

17. The non-volatile computer readable storage medium of claim 15, wherein sequentially writing comprises sending write commands to the controller of the non-volatile cache memory identifying the sequential locations within the non-volatile cache memory, without regard to the addresses or storage offsets in the non-volatile secondary storage that are associated with the write data.

* * * * *